United States Patent Office 3,463,618
Patented Aug. 26, 1969

3,463,618
SODIUM CARBONATE PERHYDRATE, ITS TREATMENT AND METHOD OF PREPARATION
John F. G. Harris, Luton, and Anthony M. Hildon, Leighton Buzzard, England, assignors to Laporte Chemicals Limited
No Drawing. Filed Dec. 9, 1966, Ser. No. 600,649
Claims priority, application Great Britain, Dec. 10, 1965, 52,596/65
Int. Cl. C01d 7/38; C01b 31/24
U.S. Cl. 23—315        20 Claims

ABSTRACT OF THE DISCLOSURE

Sodium carbonate perhydrate is obtained in a free-flowing form, of bulk density 0.2–0.75 gm./cc., by forming a paste with 10–40% by weight of water, passing the paste through a sieve of an opening 0.5–2.5 mm., drying and then passing the agglomerates through a sieve of an opening 0.5–2.5 mm. A solvent in which water and the perhydrate are not soluble, may be used and the material is maintained suspended in turbulence and then it is separated in granular form.

---

This invention relates to peroxygen compounds and more particularly relates to novel forms of sodium carbonate perhydrate, that is material having the chemical formula $Na_2CO_3 \cdot 1\frac{1}{2} H_2O_2$ and to process for producing them.

This invention provides sodium carbonate perhydrate in a form which will flow freely and has a bulk density measured by the free flow method described hereafter of from 0.2 to 0.75 g./cc. and/or in a form consisting of particles of which at least 60% by weight have a diameter from 0.3 to 2.5 mm.

When we say that our perhydrate will flow freely through an aperture we mean that when a quantity of the perhydrate is placed in a conical receptacle having sides at an angle to the horizontal greater than the angle of repose of the perhydrate and a circular aperture 21 mm. in diameter at the bottom, it will flow through the aperture without the application of external energy.

When, hereafter, we refer to a product having a certain value of bulk density we mean that it also possesses the free flowing property referred to.

Advantageously sodium carbonate perhydrate of our invention has a bulk density of from 0.2 to 0.75 g./cc. and also consists of particles of which at least 60% by weight have a diameter from 0.5 to 2.5 mm.

This advantageous form of sodium carbonate perhydrate exhibits a most desirable combination of solution rate and free flowing properties and is particularly suittable for use in dry detergent blends and this invention also provides such blends and detergent solutions produced from such blends.

Alternatively or additionally our sodium carbonate perhydrate consists of particles of which at least 60% by weight have a diameter from 0.3 to 1.5 mm. and very advantageously of particles of which at least 80% by weight have a diameter from 0.35 mm. to 0.70 mm. or alternatively of which substantially 100% have a diameter of from 0.30 mm. to 0.80 mm.

The bulk density is advantageously at least 0.25 g./cc. preferably from 0.25 to 0.62 g./cc. and most preferably from 0.3 to 0.50 g./cc.

Particularly advantageous sodium carbonate perhydrate according to the invention has a bulk density of from 0.25 to 0.62 g./cc. and also consists of particles of which at least 80% by weight have a diameter of from 0.35 to 0.70 mm.

This invention also provides a process for the production of the novel forms of sodium carbonate perhydrate provided by the invention, which comprises forming a paste comprising a known form of sodium carbonate perhydrate for instance comprising particles of which more than 40% by weight have diameters less than 0.3 mm. and preferably also having a bulk density outside the range of 0.2–0.75 g./cc. and from 10% to 40% by weight thereof of water passing the paste through at least one opening having a diameter of from 0.5 to 2.5 mm. drying the resulting agglomerates at a temperature between 15° C. and the decomposition temperature of the perhydrate and passing the dried agglomerates through at least one opening having a diameter from 0.5 to 2.5 mm.

Advantageously the opening or openings through which the dried agglomerates are passed are equal and regular and have the same dimensions as those through which the paste is passed, each preferably having a diameter not less than 0.7 mm. and not greater than 1.5 mm. In practice it is most suitable to pass both the paste and the dried agglomerates through a body having a number of suitable openings, for example a perforated plate or sieve, the body advantageously being of a material which does not adversely effect the stability of the perhydrate product for example stainless steel. The agglomerates may be dried at or near ambient temperature but preferably are dried at somewhat elevated temperatures, for instance 30° to 60° C.

Advantageously the sodium carbonate perhydrate paste contains from 15% to 35%, preferably 20% to 30% of water. Normal stabilising materials may also be used.

The size range of the novel sodium carbonate perhydrate product can be controlled at least in part by varying the particle size of the sodium carbonate perhydrate starting material and/or the size of the openings used. Thus, increasing the size of the starting material and/or decreasing the size of the opening used tends to give a product having a more restricted particle size range.

Particularly advantageous processes according to the present invention comprise forming a paste of sodium carbonate perhydrate of which more than 75% by weight consists of particles of from 0.15 to 0.30 mm. in diameter and from 20% to 30% preferably from 15% to 25% thereof of water passing the paste through a sieve having mesh size of 0.7 to 1.5 mm. preferably 0.7 to 0.8 mm. drying the resultant agglomerates at from 15° C. to 60° C. and passing the dried agglomerates through a sieve having a mesh size of 0.7 to 1.5 mm. preferably 0.7 to 0.8 mm.

The invention also provides a further process for the production of the novel forms of sodium carbonate perhydrate comprising contacting a known form of sodium carbonate perhydrate for instance consisting of particles of which more than 40% have diameters less than 0.3 mm. and preferably also a bulk density outside the range of 0.2 to 0.75 g./cc. and 15% to 35% thereof of water in at least 1.5 litres of an inert medium, in which water and sodium carbonate perhydrate are substantially insoluble and which is substantially wholly maintained in turbulence sufficient to maintain the perhydrate in suspension, per kilogram of perhydrate, maintaining the suspension in turbulence for at least 5 minutes, preferably for from 5 to 30 minutes, and separating the resulting granular product from the inert medium.

The minimum amount of inert medium normally sufficient to maintain sodium carbonate perhydrate in suspension is 1.5 litres per 1000 g. of perhydrate irrespective of the amount of turbulence employed. Therefore the inert medium is present, essentially in at least 1.5 litres per 1000 g. of perhydrate.

In this further process the features relating to the proportion of inert solvent and water present and to the maintenance of turbulence in the system are all essential to the production of our novel product.

When less than the required proportion of solvent is present the resulting perhydrate will not flow sufficiently freely and when a proportion of water outside the required range is used the product either comprises small particles having a bulk density above 0.75 g./cc. or comprises large agglomerates which do not fulfill our free flow requirements.

While the inert medium may be maintained at any temperature from about 5° C. to 50° C. during the process, room temperature, or a temperature slightly below that, is preferred.

It is also essential to maintain substantially the whole of the inert solvent suspension in turbulence and advantageously this is achieved by stirring. In the following examples of the process according to our invention, turbulence is ensured by using a cylindrical container for the inert solvent and two stirrers, each having four blades, and having a diameter of approximately one third that of the container. The stirrers are so positioned that each stirring head is at a different level in the solvent, the blades thereof have a pitch of approximately 30° to the vertical and that neither apparently overlaps the other in plan view. The stirrers were run at 200 to 400 r.p.m. Advantageously turbulence is maintained from 5 to and about 60 minutes preferably 5 to 30 minutes.

In more advantageous forms of the process the inert medium is present in at least 2.2 litres per 1000 g. of the sodium carbonate perhydrate and is preferably controlled below 3 litres per 1000 g. thereof, water advantageously being present in from 15% to 30% by weight of the sodium carbonate perhydrate, preferably from 15 to 25% by weight thereof. Any medium which does not react with the perhydrate and in which water and the perhydrate are substantially insoluble, for instance chloroform or toluene, is suitable, but carbon tetrachloride or trichlorethylene is preferred.

We prefer to form the mixture by suspending the sodium carbonate perhydrate in the medium by agitation and adding water to the agitated suspension. Alternatively the anhydrous sodium carbonate perhydrate may be slowly added to an agitated dispersion comprising water and the medium. However dropwise addition of water to the suspension should be avoided.

We have found that it is particularly advantageous and enables a suitably short period of agitation to be used to add sodium silicate to the suspension before agitation has ceased. A suitable amount of silicate is from 10 to 15 ml. of 30° Tw material per gram mole of product formed.

Alternatively and advantageously the known sodium carbonate perhydrate may be introduced into the dispersion by forming it in the inert medium for instance by reaction therein between anhydrous sodium carbonate and hydrogen peroxide. When this embodiment of the process is being performed the hydrogen peroxide is preferably introduced together with the water as aqueous hydrogen peroxide and preferably should not be allowed to come into contact with the sodium carbonate before both reactants are in the medium. A slight theoretical excess of hydrogen peroxide may advantageously be used.

Advantageously the medium is present in at least 2.2 litres per 1000 g. of perhydrate expected and water being present in from 15% to 30%, by weight of the reactants. Optionally magnesium or sodium silicate may be added to the medium in an amount equivalent to from 10 to 15 ml. of 30° Tw material per gram mole of sodium carbonate perhydrate product expected. Preferably the medium is maintained substantially wholly in turblence for a further 45 to 60 minutes and separating the resulting particles from the inert medium.

The invention particularly provides a process for the production of sodium carbonate perhydrate having a bulk density of from 0.25–0.62 g./cc. and comprises particles of which at least 80% by weight have a diameter of from 0.35 to 0.70 mm. comprising contacting sodium carbonate perhydrate which comprises particles of which more than 75% by weight have diameters between 0.15 and 0.30 with from 15% to 30% by weight thereof of water in from 22 to 3.0 litres of inert medium, in which water and sodium carbonate perhydrate are insoluble and which is substantially wholly maintained in turbulence sufficient to suspend the perhydrate, per kilogram of perhydrate, maintaining the turbulence for from 20 to 90 minutes, and separating the resulting particles from the inert medium. Preferably the turbulence is conducted at from 15° C. to 25° C.

The bulk density of samples of sodium carbonate perhydrate is measured herein by measuring the apparent specific gravity by free flow by the following technique.

A truncated cone-shaped hopper of stainless steel having a maximum internal diameter of 53 mm., a minimum internal diameter of 21 mm., an axial height of 58 mm. and provided at its narrow end with a totally opening shutter, is clamped in the axially vertical position and filled with sodium carbonate perhydrate until it overflows, the top being levelled off without compression of the contents.

A cylindrical cup of stainless steel of internal diameter of 45.2 mm. and having a substantially equal height and of 50 ml. capacity is placed vertically below the hopper the lower end of the hopper being 65 mm. above the plane of the top of the cup and the cup is then filled to overflowing from the hopper and is levelled off without compression of the contents. The apparent specific gravity by free flow (bulk density) is the weight in grams of the contents of the cup divided by 50.

This invention also provides processes for the production of sodium carbonate perhydrate as disclosed in Examples 1–9 or 12–15 and sodium carbonate perhydrate when so produced.

This invention will now be illustrated by means of Examples 1 to 9 and 12 to 15. Examples 10 and 11 are not according to this invention and are inserted for comparative purposes only.

Example 1

A 0.15–0.21 mm. fraction of sodium carbonate perhydrate of a bulk density of 0.86 g./cc. made by the reaction of $H_2O_2$ and $Na_2CO_3$ in aqueous solution was treated with water to give a paste containing 25% moisture. This paste was extruded through a 1.4 mm. sieve and dried in the air. In the dry state the salt was pressed through the sieve again.

The product obtained was granular, had a bulk density of 0.49 g./cc., showed excellent mobility and solubility characteristics and gave the following sieve analysis:

| Diameter, mm.: | Percent by weight |
| --- | --- |
| >0.85 | 69 |
| >0.60 | 81 |
| >0.355 | 90 |
| >0.21 | 94 |
| >0.15 | 98 |

Example 2

Example 1 was repeated with the sole difference that a 0.71 mm. sieve was used for the extrusion.

The product obtained was granular, has a bulk density of 0.57 g./cc., showed excellent mobility and solubility characteristics and gave the following analysis:

| Diameter, mm.: | Percent by weight |
|---|---|
| >0.60 | 51 |
| >0.50 | 64 |
| >0.355 | 80 |
| >0.21 | 90 |
| >0.15 | 97 |

Example 3

Example 1 was repeated with the sole difference that the water content of the paste was 30% by weight.

The product was granular and free flowing and had a bulk density of 0.35 g./cc. and gave the following sieve analysis:

| Diameter, mm.: | Percent by weight |
|---|---|
| >0.85 | 65 |
| >0.60 | 78 |
| >0.355 | 89 |
| >0.21 | 93 |
| >0.15 | 98 |

Example 4

Example 2 was repeated with the sole difference that the water content of the paste was 30% by weight.

The product was granular and free flowing, has a bulk density of 0.60 g./cc. and the following sieve analysis:

| Diameter, mm.: | Percent by weight |
|---|---|
| >0.60 | 46 |
| >0.50 | 58 |
| >0.355 | 75 |
| >0.21 | 85 |
| >0.15 | 95 |

Example 5

Example 4 was repeated with the sole difference that the sodium carbonate perhydrate starting material used had no particles as large as 0.15 mm. in diameter.

The product was granular and free flowing, and a bulk density of 0.61 g./cc. and had the following sieve analysis:

| Diameter, mm.: | Percent by weight |
|---|---|
| >0.60 | 31 |
| >0.50 | 39 |
| >0.355 | 52 |
| >0.21 | 66 |
| >0.15 | 74 |

Example 6

Example 1 was repeated with the sole difference that the sodium carbonate perhydrate used merely passed a sieve having 0.5 mm. holes, that the sieve used had 0.994 mm. diameter holes and that the paste had a moisture content of 27.75%.

The product was granular and free flowing, and a bulk density of 0.62 and the following sieve analysis:

| Diameter, mm.: | Percent by weight |
|---|---|
| >0.80 | 22 |
| >0.50 | 61 |
| >0.25 | 82 |
| >0.15 | 89 |
| >0.077 | 96 |

The product of this experiment was noted to have particularly good stability in admixture with a dry detergent blend stored at ambient temperature.

Example 7

Example 6 was repeated with the sole difference that the starting material was a 0.15–0.25 mm. fraction. The product was granular and free flowing, had a bulk density of 0.55 g./cc. and the following sieve analysis:

| Diameter, mm.: | Percent by weight |
|---|---|
| >0.80 | 17 |
| >0.50 | 61 |
| >0.25 | 83 |
| >0.15 | 93 |
| >0.077 | 97 |

This product was also noted to exhibit good stability properties in a dry detergent blend at ambient temperature.

Example 8

318 g. of anhydrous sodium carbonate was suspended in 1125 ml. of carbon tetrachloride at room temperature and 255 ml. of 50% $H_2O_2$ solution was slowly added at a temperature of about 10° C., substantially the whole of the resulting mixture being maintained in turbulence by stirring in the manner described already. After the peroxide addition 43.5 ml. of 30° Tw sodium silicate was added and then the suspension was stirred for a further 70 minutes. The resultant product was filtered and dried.

The dried product was granular and free-flowing, had a bulk density of 0.55 g./cc., showed excellent mobility and solubility characteristics and gave the following sieve analysis:

| Diameter, mm.: | Percent by weight |
|---|---|
| >1.4 | 18 |
| >1 | 70 |
| >0.5 | 98 |

Example 9

A quantity of sodium carbonate perhydrate of bulk density of 0.82 g./cc. and having the sieve analysis:

| Diameter, mm.: | Percent by weight |
|---|---|
| <0.25 | 16 |
| <0.152 | 58 |
| <0.077 | 89 | was contacted at room temperature with 18.4% thereof of water in a carbon tetrachloride medium which was present in more than 250% by weight of the perhydrate and the resulting mixture was maintained in turbulence already described for more than five minutes. The resulting sodium carbonate perhydrate granular product having a bulk density of 0.68 g./cc. was filtered off and dried and had the following sieve analysis:

| Diameter, mm.: | Percent by weight |
|---|---|
| >0.994 | 59 |
| >0.801 | 72 |
| >0.501 | 94 |
| >0.251 | 97 |
| >0.152 | 99 |
| >0.077 | 100 |

Example 10

106 g. of anhydrous sodium carbonate was maintained in turbulent suspension by means of stirring, in 200 g. of carbon tetrachloride and 122 g. of a 56% $H_2O_2$ solution was slowly added to the suspension at a temperature of about 10° C. After the hydrogen peroxide had all been added the suspension began to thicken slowly and when stirring was stopped after two hours the suspension became solid and the resulting perhydrate compound was broken up and separated from the solvent by filtration. The product was not granular, consisted of large agglomerations of particles and did not flow sufficiently freely for its bulk density to be measured as described herein.

Example 11

Example 10 was repeated using, instead, 158 grams of a 43% $H_2O_2$ solution. The product was not granular but consisted of a solid mass which did not flow sufficiently freely for its bulk density to be measured as described herein.

Example 12

318 g. of anhydrous sodium carbonate was suspended 1125 ml. of carbon tetrachloride and 205 ml. of 65% $H_2O_2$ solution was slowly added over a period of 65 minutes keeping the temperature between 5 and 10° C., substantially the whole of the resulting mixture being maintained in turbulence by stirring in the manner described already. After the peroxide addition the suspension was stirred for a further 5 minutes then filtered and dried.

The dried product gave the following sieve analysis:

| Diameter, mm.: | Percent by weight |
| --- | --- |
| >0.251 | 16 |
| >0.152 | 92 |
| >0.077 | 99.9 |

400 g. of this product was suspended in 1125 ml. of carbon tetrachloride and 115 ml. of water was added over a period of 70 minutes keeping the temperature between 18 and 22° C., and maintaining the mixture in turbulence in the manner described already. The resulting sodium carbonate perhydrate was filtered and dried.

The resultant product was granular and free-flowing, had a bulk density of 0.54 g./cc., showed excellent mobility and solubility characteristics and gave the following sieve analysis:

| | Percent |
| --- | --- |
| >.853 mm. | 3.5 |
| .801–.853 mm. | 2.5 |
| .699–.801 mm. | 11 |
| .501–.699 mm. | 66 |
| .353–.501 mm. | 15.8 |
| .295–.353 mm. | 0.9 |
| .251–.295 mm. | 0.1 |
| <.251 mm. | 0.3 |

Example 13

The process of Example 9 was repeated with the following differences. The sodium carbonate perhydrate starting material had a bulk density of 0.87 g./cc. and had the following sieve analysis:

| Diameter, mm.: | Percent by weight |
| --- | --- |
| <0.71 | 1 |
| <0.355 | 34 |
| <0.25 | 45 |
| <0.152 | 89 |
| <0.077 | 100 |

The medium used was 1080 mls. of trichlorethylene. In two experiments 400 g. of the perhydrate was contacted in that medium with, respectively, 15% and 20% by weight thereof of water. The mixture was maintained in turbulence, by means of the stirring mechanism described herein, for 30 minutes, the speed of the stirrers being 300 r.p.m.

The product obtained in each run was as follows: percent water present, 15%, 20%; bulk density of product g./cc., 0.65, 0.70.

Sieve analysis of product:

| | Percent | Percent |
| --- | --- | --- |
| Diameter, mm.: | | |
| >1.4 | 10.4 | 30.8 |
| >1.0 | 21.2 | 38.8 |
| >0.71 | 48.6 | 55.5 |
| >0.355 | 81.2 | 82.0 |
| >0.25 | 90.0 | 87.0 |
| >0.152 | 98.7 | 97.8 |
| >0.077 | 100.0 | 100.0 |

Example 14

270 g. of anhydrous sodium carbonate was suspended with agitation in 1030 mls. trichlorethylene. 207 g. of 53% of $H_2O_2$ and 28 g. of water were added slowly at a temperature of 10° C. The mixture was maintained in turbulence for a further 60 minutes using the stirring apparatus described herein the stirrers rotating at 300 r.p.m. During stirring the temperature was maintained at not more than 25° C. The product had a bulk density of 0.47 g./cc. and the following sieve analysis:

| Diameter, mm.: | Percent by weight |
| --- | --- |
| >1.4 | 9.0 |
| >1.0 | 19.3 |
| >0.8 | 33.0 |
| >0.71 | 44.0 |
| >0.355 | 98.5 |
| >0.30 | 99.0 |

What is claimed is:

1. A granular free-flowing sodium carbonate perhydrate of the formula $Na_2CO_3.1\frac{1}{2}H_2O_2$ having a bulk density of from 0.2 to 0.75 g./cc. and at least 60% by weight of which comprises particles of from 0.3 to 2.5 mm. in diameter.

2. Sodium carbonate perhydrate as claimed in claim 1 of which at least 60% by weight comprises particles of from 0.3 to 1.5 mm. in diameter.

3. Sodium carbonate perhydrate as claimed in claim 2 of which at least 80% by weight comprises particles of from 0.35 to 0.70 mm. in diameter.

4. Sodium carbonate perhydrate as claimed in claim 2 substantially comprising particles of from 0.30 to 0.80 mm., in diameter.

5. The process for the production of the sodium carbonate perhydrate according to claim 1 which comprises forming a reaction mixture from anhydrous sodium carbonate, hydrogen peroxide in at least 1.5 litres of an inert medium per kilogram of perhydrate expected in theory and water in amount between 15% and 35% by weight of perhydrate expected in theory, the inert medium being one in which water and sodium carbonate perhydrate are insoluble, maintaining the mixture in turbulence sufficient to suspend the resulting perhydrate, maintaining the turbulence for at least 5 minutes, separating the resulting granular product from the inert medium and residual water phase and drying the product produced.

6. The process according to claim 5 wherein the inert medium is present in amount between 2.2 and 3.0 litres per kilogram of perhydrate expected in theory.

7. The process according to claim 5 wherein the turbulence is maintained for a period of between 5 and 90 minutes.

8. The process according to claim 5 wherein the inert medium is carbon tetrachloride or trichlorethylene.

9. The process according to claim 5 wherein the temperature of the inert medium is maintained at between 5° C. and 50° C.

10. The process according to claim 5 wherein about a theoretical quantity of hydrogen peroxide is used.

11. The process according to claim 5 wherein the granular product is separated from the inert medium and residual water by filtration followed by drying.

12. A process for the production of sodium carbonate perhydrate of the formula $Na_2CO_3.1\frac{1}{2}H_2O_2$ having a bulk density of from 0.2 to 0.75 g./cc. and of which at least 60% by weight comprises particles of from 0.3 to 2.5 mm. in diameter comprising contacting sodium carbonate perhydrate of which more than 40% by weight comprises particles having diameters less than 0.3 mm. with from 15% to 35% by weight thereof of water in at least 1.5 litres of an inert medium, in which water and sodium carbonate perhydrate are insoluble and which is substantially wholly maintained in turbulence sufficient to suspend the perhydrate, per kilogram of perhydrate, maintaining the turbulence for at least 5 minutes, separating the resulting granular product from the inert medium and drying the resultant product.

13. A process as claimed in claim 12 where the turbulence is maintained for from 5 to 30 minutes.

14. A process as claimed in claim 12 wherein the inert medium is present in from 2.2 to 3.0 litres per kilogram of perhydrate.

15. A process as claimed in claim 12 where the inert medium is carbon tetrachloride or trichlorethylene and the temperature of the inert medium is maintained at from 5° C. to 50° C.

16. A process according to claim 12 wherein the sodium carbonate perhydrate is formed in situ, by reaction between anhydrous sodium carbonate and hydrogen peroxide in contact with said inert medium.

17. A process for the production of sodium carbonate perhydrate of the formula $Na_2CO_3 \cdot 1\frac{1}{2}H_2O_2$ having a bulk density of from 0.2 to 0.75 g./cc. and of which at least 60% by weight comprises particles of from 0.3 to 2.5 mm. in diameter which comprises reacting anhydrous sodium carbonate and hydrogen peroxide in at least 2.2 litres of an inert medium per kilogram of perhydrate expected in theory, water being present in from 15 to 30% by weight of the perhydrate expected in theory, the inert medium being a medium in which water and sodium carbonate perhydrate are insoluble, maintaining the mixture in turbulence sufficient to suspend the perhydrate, maintaining the turbulence for at least 5 minutes, separating the resulting granular product from the inert medium and drying the product produced.

18. A process as claimed in claim 17 wherein the turbulence is maintained for from 45 to 60 minutes.

19. A process for the production of sodium carbonate perhydrate of the formula $Na_2CO_3 \cdot 1\frac{1}{2}H_2O_2$ having a bulk density of from 0.2 to 0.75 g./cc. and of which at least 60% by weight comprises particles of from 0.3 to 2.5 mm. in diameter comprising contacting sodium carbonate perhydrate of which more than 40% by weight comprises particles having diameters less than 0.3 mm. with from 15% to 35% by weight thereof of water in at least 1.5 litres of an inert medium, in which water and sodium carbonate perhydrate are insoluble and which is substantially wholly maintained in turbulence sufficient to suspend the peryhydrate, per kilogram of perhydrate, maintaining the turbulence for at least 5 minutes, separating the resulting granular product from the inert medium wherein from 10 to 15 ml. of 30° Tw sodium or magnesium silicate, per gram-mole of sodium carbonate perhydrate formed, is added to the inert medium before turbulence is stopped and drying the product produced.

20. A process for the production of a sodium carbonate perhydrate of the formula $Na_2CO_3 \cdot 1\frac{1}{2}H_2O_2$ having a bulk density of from 0.2 and 0.75 g./cc. and at least 60% by weight of which comprises particles of from 0.3 and 2.5 mm. in diameter which comprises forming a reaction mixture from anhydrous sodium carbonate, about a theoretical amount of hydrogen peroxide for the formation of $Na_2CO_3 \cdot 1\frac{1}{2}H_2O_2$, in at least 2.2 litres of inert medium per kilogram of perhydrate expected in theory and water in amount between 15% and 30% by weight of the perhydrate expected in theory, the inert medium being one in which water and sodium carbonate perhydrate are insoluble, maintaining the mixture at a temperature between 15° C. and 25° C., in turbulence for a period of between 5 and 60 mintues after the reaction mixture has been formed, separating the resulting granular product from the inert medium and residual water by filtration, and drying the product produced.

References Cited

UNITED STATES PATENTS

| 1,524,968 | 2/1925 | Des Ylouses | 23—293 |
| 2,934,412 | 4/1960 | Stengel | 23—313 |
| 3,140,149 | 7/1964 | Habernickel | 23—315 |

OSCAR R. VERTIZ, Primary Examiner

HOKE S. MILLER, Assistant Examiner

U.S. Cl. X.R.

23—313